Sept. 24, 1957  M. W. BAKER  2,807,151

EXPANSION VALVE CONTROL

Filed Oct. 27, 1954

INVENTOR.
MARSHALL W. BAKER
BY
R. R. Candor
ATTORNEY

和合国 Patent Office 2,807,151
Patented Sept. 24, 1957

2,807,151

EXPANSION VALVE CONTROL

Marshall W. Baker, Dayton, Ohio, assignor to General Motors Corporation, Detroit, Mich., a corporation of Delaware Application October 27, 1954, Serial No. 465,093

5 Claims. (Cl. 62—8)

This invention relates to refrigerating apparatus and more particularly to an automobile air conditioning system.

A number of problems present themselves in designing an automobile air conditioning system and control therefor which are not present in designing other types of air conditioning systems and controls. One of the reasons for this is that the car engine which is used for driving the refrigerant compressor operates at widely varying speeds without any regard for refrigeration requirements, with the result that the compressor capacity is frequently the highest when little or no refrigeration is required. This makes it difficult to properly balance the capacity of the refrigerating system with the refrigeration requirements. Furthermore, the space in a passenger automobile for the refrigeration equipment and particularly the evaporator is very limited with the result that the component parts must be made very small. Attempts to use small evaporators with closely spaced fins so as to obtain maximum heat transfer between the air and the refrigerant have unduly interfered with the air circulation and have made it very difficult to prevent freeze-up of the evaporator at high car speeds when the refrigeration requirements are low. Refrigerant by-pass arrangements and compressor unloaders have been tried but these require expensive and troublesome valves, etc. It is an object of this invention to provide a simple and inexpensive control arrangement which will compensate for excessive compressor speeds and at the same time prevent freeze-up of the evaporator at light refrigeration loads.

Another object of this invention is to provide a control arrangement which does not require the use of expensive and troublesome valves.

Still another object of this invention is to provide a control arrangement which can withstand the vibration and jarring encountered in an automobile air conditioning system.

Further objects and advantages of the present invention will be apparent from the following description, reference being had to the accompanying drawings, wherein a preferred form of the present invention is clearly shown.

Figure 1:
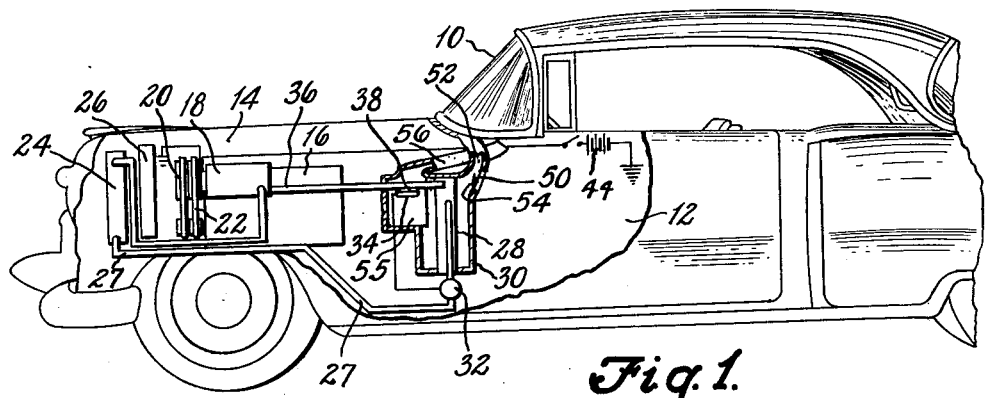
Figure 1 is an elevational view, with parts broken away, showing somewhat diagrammatically an air conditioning unit constructed in accordance with the invention.
Figure 2:
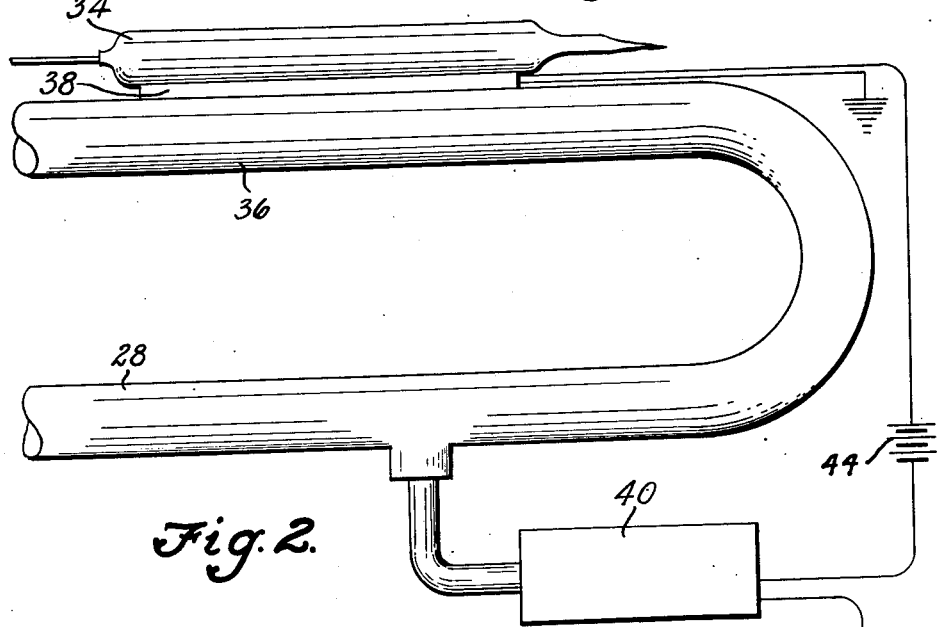
Figure 2 is a fragmentary elevational view showing the construction and arrangement of the controls; and, Figure 3 is a diagrammatic view showing the relationship of the controls to the refrigeration system.
Figure 3:
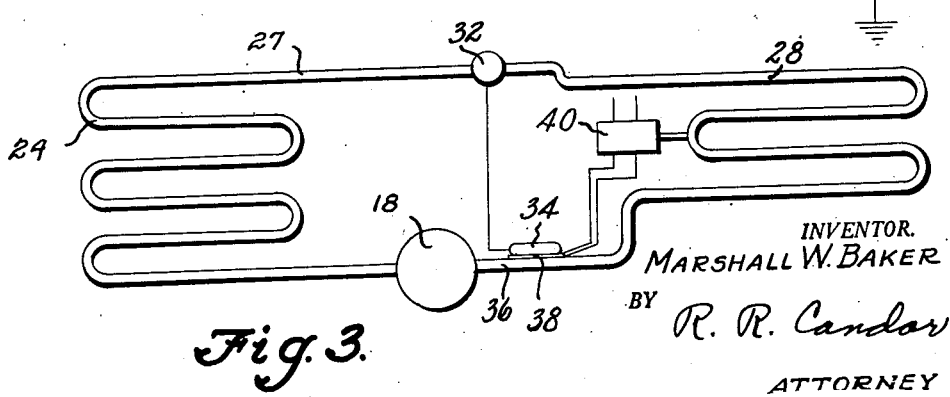

Referring now to the drawing wherein a preferred embodiment of the invention has been shown, reference numeral 10 generally designates a conventional passenger vehicle having a passenger compartment 12 and an engine compartment 14 in which there is mounted a main engine 16 which serves to supply power for operating the vehicle and the air conditioning equipment.

The air conditioning equipment includes a conventional refrigerant compressor 18 which is adapted to be driven by the main car engine 16 through a clutch 20 and belt means 22. The compressor 18 discharges the compressed refrigerant into a condenser 24 which is preferably located directly in front of the main engine radiator 26 so as to be cooled by the incoming air which cools the engine radiator and engine compartment in accordance with standard practice. The condensed refrigerant flows through a liquid line 27 into an evaporator 28 mounted in an evaporator and blower housing 30 which is preferably located on the dashboard or fire wall which separates the passenger compartment from the engine compartment.

The flow of liquid refrigerant through the line 27 is controlled by a conventional thermostatic expansion valve 32 which is provided with the usual thermal bulb 34. The thermal bulb 34 is arranged in thermal exchange relationship with the refrigerant outlet line 36 which leads from the evaporator to the compressor and normally serves to throttle thhe flow of refrigerant into the evaporator when the liquid refrigerant enters the evaporator at a greater rate than necessary to keep the evaporator filled with liquid refrigerant. When liquid refrigerant enters the suction line the refrigerating effect thereof cools the thermal bulb 34 so as to cause the expansion valve to close or partially close in accordance with well known practice. If this should happen at a time when the cooling load is light and the compressor is being driven at a high speed, the suction pressure would quickly drop so low that the evaporator would operate at a temperature low enough to freeze any water which would condense on the evaporator.

In order to prevent this from happening, there is provided an electric heater 38 between the bulb 34 and the suction line 36 which serves to artificially heat the thermal bulb 34 so as to cause opening of the valve 32 for the purpose of preventing abnormally low pressures in the evaporator. This heater 38 is supplied with power from the usual car battery 44 and the supply of power thereto is controlled by means of a low pressure responsive switch device 40 which automatically closes the circuit to the heater 38 whenever the pressure within the evaporator falls below a predetermined value corresponding to the pressure at which the condensate would begin to freeze.

The housing 30 in which the evaporator is located is adapted to be supplied with recirculated air through an air inlet 50 which communicates with the passenger compartment of the car. Fresh air may be introduced into the housing through the fresh air intake 52. A damper 54 is arranged as shown and may be used to control the proportions of fresh air and recirculated air entering the housing 30. The conditioned air is discharged by the blower 55 into the passenger compartment via the duct 56. For purposes of illustration, the duct 56 has been shown as discharging the conditioned air into the front portion of the passenger compartment, whereas any suitable air distributing duct arrangement could be provided without departing from the spirit of the invention.

While the form of embodiment of the invention as herein disclosed constitutes a preferred form, it is to be understood that other forms might be adopted, as may come within the scope of the claims which follow. What is claimed is as follows:

1. In an air conditioning system, a compressor, a condenser, an evaporator, refrigerant flow connections between said compressor, condenser and evaporator, a thermostatic expansion valve in said connections adjacent the inlet side of said evaporator, said thermostatic expansion valve including thermal means responsive to the temperature at the outlet of said evaporator for controlling the flow of refrigerant through said valve, means for applying heat to said thermal means in response to a predetermined decrease in the pressure within said evaporator so as to cause opening of said valve for the purpose of preventing the temperature of said evaporator from falling below a predetermined value.

2. In an air conditioning system, a compressor, a condenser, an evaporator, refrigerant flow connections between said evaporator, compressor and condenser, valve means for controlling the admission of liquid refrigerant into said evaporator, control means responsive to the temperature of the refrigerant leaving said evaporator for controlling said valve means, and heating means responsive to the pressure within said evaporator for varying the effectiveness of said control means, said last named means comprising a device responsive to the pressure within said evaporator for controlling the energization of said heating means.

3. In a vehicle; a main engine for propelling said vehicle at widely varying speeds; refrigerating apparatus for cooling air for use in said vehicle; said apparatus comprising a compressor, a condenser, an evaporator, and refrigerant flow connections between said compressor, condenser and evaporator; torque transmitting means between said engine and said compressor whereby said compressor is operated at widely varying speeds independent of refrigeration requirements; a thermostatic expansion valve in said refrigerant flow connections for controlling the admission of liquid refrigerant into said evaporator; said thermostatic expansion valve including a temperature responsive bulb arranged adjacent the outlet of said evaporator; an electric heater arranged in thermal exchange relationship with said bulb and with the refrigerant leaving the said evaporator; and means for controlling the energization of said electric heater including a pressure operated switch responsive to changes in the pressure within said evaporator.

4. In a vehicle; a main engine for propelling said vehicle at widely varying speeds; refrigerating apparatus for cooling air for use in said vehicle; said apparatus comprising a compressor, a condenser, an evaporator, and refrigerant flow connections between said compressor, condenser and evaporator; torque transmitting means between said engine and said compressor whereby said compressor is operated at widely varying speeds independent of refrigeration requirements; a thermostatic expansion valve in said refrigerant flow connections for controlling the admission of liquid refrigerant into said evaporator; said thermostatic expansion valve including a temperature responsive bulb arranged adjacent the outlet of said evaporator; an electric heater arranged in thermal exchange relationship with said bulb and with the refrigerant leaving the said evaporator; and means for controlling the energization of said electric heater including a pressure operated switch responsive to changes in the pressure within said evaporator; said heater comprising a heating element disposed between said bulb and the outlet of said evaporator.

5. In combination; a vehicle having a passenger compartment and an engine compartment; an engine within said engine compartment for propelling said vehicle at widely varying speeds; air conditioning apparatus for cooling the air for use in said passenger compartment; said air conditioning apparatus including a housing mounted in said engine compartment, an evaporator in said housing, means for circulating air from said passenger compartment in thermal exchange relationship with said evaporator and for discharging the air thus cooled into said passenger compartment, a condenser, a compressor, torque transmitting means between said compressor and said engine, refrigerant flow connections between said compressor, condenser and evaporator, and a thermostatic expansion valve in said connections adjacent the inlet side of said evaporator for controlling the admission of liquid refrigerant into the said evaporator; said thermostatic expansion valve including thermal means responsive to the temperature of the refrigerant leaving said evaporator; and means responsive to a predetermined decrease in the pressure within said evaporator for applying heat to said thermal means so as to cause opening of said valve whereby to prevent the temperature of said evaporator from falling below a predetermined value.

References Cited in the file of this patent
UNITED STATES PATENTS

| | | |
|---|---|---|
| 2,078,966 | Newill | May 4, 1937 |
| 2,220,998 | Holmes | Nov. 12, 1940 |
| 2,264,821 | Zukoski | Dec. 2, 1941 |
| 2,319,005 | Lum | May 11, 1943 |
| 2,346,017 | Errath | Apr. 4, 1944 |
| 2,385,243 | Wiegers | Sept. 18, 1945 |
| 2,400,334 | Berry | May 14, 1946 |
| 2,572,501 | Matteson | Oct. 23, 1951 |